United States Patent [19]

Fukube et al.

[11] Patent Number: 4,656,988

[45] Date of Patent: Apr. 14, 1987

[54] AUTOMOBILE FUEL SUPPLY CONTROL

[75] Inventors: Tsugio Fukube; Akinori Yamashita; Noboru Hashimoto; Hiroyuki Yamamoto, all of Hiroshima, Japan

[73] Assignee: Mazda Motor Corporation, Hiroshima, Japan

[21] Appl. No.: 846,946

[22] Filed: Apr. 1, 1986

[30] Foreign Application Priority Data

Apr. 4, 1985 [JP] Japan .................................. 60-71558

[51] Int. Cl.4 ............................................ F02M 51/00
[52] U.S. Cl. .................................... 123/489; 123/492; 123/493
[58] Field of Search ............... 123/489, 440, 480, 492, 123/493, 406, 417, 421, 422, 423

[56] References Cited

U.S. PATENT DOCUMENTS

| | | | |
|---|---|---|---|
| 4,526,153 | 7/1985 | Hascgawa et al. | 123/489 |
| 4,542,729 | 9/1985 | Yamato et al. | 123/489 |
| 4,552,116 | 11/1985 | Kuriwa et al. | 123/492 |
| 4,561,403 | 12/1985 | Oyama et al. | 123/492 |
| 4,582,037 | 4/1986 | Otsaka et al. | 123/492 |

Primary Examiner—Raymond A. Nelli
Attorney, Agent, or Firm—Burns, Doane, Swecker & Mathis

[57] ABSTRACT

A fuel supply control system for an automobile engine comprises a detector for detecting change in engine operating condition, a fuel adjuster for variably controlling the amount of fuel to be supplied to the engine, an A/F ratio setting device for setting the lower or higher A/F ratio of a combustible mixture than the critical A/F ratio to a higher or lower A/F ratio than a critical A/F ratio at which the engine can produce substantially the same or intermediate torque as that produced by the same engine with the supply of such combustible mixture, and a control operable in response to an output from the detector to control the fuel adjuster in such a way that, at the time the engine is desired or required to be switched from one engine operating condition to another, the A/F ratio lower or higher than the critical A/F ratio can be rapidly adjusted to the higher or lower A/F ratio set by the A/F ratio setting device and, thereafter, the A/F ratio can be progressively adjusted to a target or desired value.

14 Claims, 6 Drawing Figures

AUTOMOBILE FUEL SUPPLY CONTROL

BACKGROUND OF THE INVENTION

The present invention relates to a fuel supply control system for an internal combustion engine.

More particularly, the present invention pertains to the adjustment of the air-fuel mixing ratio of a combustible mixture to be supplied to the engine according to engine operating condition between values lower and higher, respectively, than the air-fuel mixing ratio at which the emission of nitric oxides ($NO_x$) contained in exhaust gases emerging from the engine as a result of the combustion mixture having burned in the engine attains a maximum value.

As one example of prior art fuel supply control systems for automobile engines, Japanese Laid-open Patent Publication No. 59-96452, published June 2, 1984, discloses a system wherein, while a feedback or closed-loop control is employed as a rule to control the combustible mixture to be supplied to the engine to a stoichiometric air-fuel mixing ratio in dependence on the concentration of a selected constituent of the exhaust gases emitted as a result of the combustion of the combustible mixture which has taken place in the engine, the combustible mixture can be controlled to a higher air-fuel mixing ratio than the stoichiometric value during a particular engine operating condition.

Another example of a fuel supply control system is known wherein, while the combustible mixture is, as a rule, leaned as much as possible within a tolerance of roughness, the combustible mixture can be controlled to a lower air-fuel mixing ratio during acceleration or a high load engine operating condition to permit the engine to produce an increased type.

While the adjustment of the air-fuel mixing ratio, or briefly speaking, A/F ratio, based on the feedback control scheme has now been widely practiced in most automobile engine systems, the adjustment of the A/F ratio from a high value to a low value or from a lower value to a high value according to an engine operating condition is, in order to minimize the emission of nitric oxides ($NO_x$), preferred to be carried out in such a way that the A/F ratio after and before such adjustment will not take a value at which the $NO_x$ emission is considered maximum and which is generally considered to be about 16. In other words, in order to minimize the $NO_x$ emission, the A/F ratio of the combustible mixture to be supplied to the engine according to an engine operating condition is preferred to be quickly adjusted between values lower and higher, respectively, than the A/F ratio at which the maximum $NO_x$ emission takes place. (It is to be noted that the A/F ratio at which the maximum $NO_x$ emission takes place, that is, the $NO_x$ emission attains a maximum value will be hereinafter referred to as "critical A/F ratio".) Where the A/F ratio adjustment is progressively carried out where the combustible mixture is desired to be adjusted from the lower A/F ratio to the higher A/F ratio or from the higher A/F ratio to the lower A/F ratio with respect to the critical A/F ratio to suit the requirement for a change in engine operating condition, the supply of the combustible mixture of critical A/F ratio to the engine is sustained for a substantial length of time and the $NO_x$ emission increases correspondingly if not attaining the maximum.

On the other hand, if the A/F ratio adjustment referred to above is quickly carried out, a torque shock is likely to occur in the engine as a result of abrupt change in A/F ratio of the combustible mixture being applied to the engine.

SUMMARY OF THE INVENTION

The present invention has been devised with a view to substantially eliminating the above discussed problems and has for its essential object to provide an improved fuel supply control system effective to minimize both the $NO_x$ emission and the occurrence of a torque shock in the engine.

The present invention is based on the finding that the engine could produce substantially the same or intermediate torque when supplied with the combustible mixture of an A/F ratio deviating in one sense from the critical A/F ratio and when supplied with the combustible mixture of a different A/F ratio deviating the opposite sense from the critical A/F ratio. Accordingly, in the practice of the present invention, in order to attain a target A/F ratio which may be lower or higher than the critical A/F ratio, the combustible mixture of an A/F ratio higher or lower than the critical A/F ratio is rapidly adjusted to the A/F ratio which is lower or higher than the critical A/F ratio and at which the engine can produce substantially the same or intermediate torque as that produced by the engine with the supply of the combustible mixture of such A/F ratio higher or lower than the critical A/F ratio, respectively, and is then progressively adjusted to the target A/F ratio. Thus, combustible mixture of the critical A/F ratio will not be supplied substantially and, therefore, the $NO_x$ emission can be advantageously minimized. In addition, since the shift from one A/F ratio higher or lower than the critical A/F ratio to another A/F ratio lower or higher than the critical A/F ratio is effected without substantially changing the torque produced by the engine with the supply of the combustible mixture of said one A/F ratio, no torque shock will occur substantially in the engine.

BRIEF DESCRIPTION OF THE DRAWINGS

This and other objects and feature of the present invention will become clear from the following description of preferred forms of embodiments of the present invention made with reference to the accompanying drawings, in which.

DETAILED DESCRIPTION OF THE EMBODIMENTS

Figure 1:
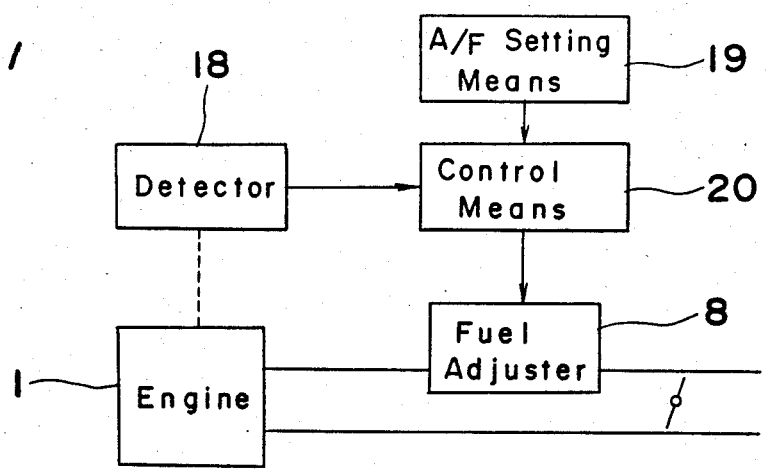
FIG. 1 is a block diagram showing the principle of fuel supply control according to the present invention.

Before the description of the present invention proceeds, it is to be noted that like parts are designated by like reference numerals throughout the accompanying drawings.

The principle of fuel supply control according to the present invention will first be described with particular reference to FIG. 1. As hereinbefore discussed, the present invention pertains to a fuel supply control system for an internal combustion engine, particularly an automobile engine, which is so designed as to adjust a combustible air-fuel mixture to be supplied to the engine 1 according to engine operating condition from one of the lower and higher A/F ratios than the critical A/F ratio, i.e., the A/F ratio at which the $NO_x$ emission from the engine is considered maximum, to the other of the lower and higher A/F ratio. As shown in FIG. 1, the fuel supply control system comprises a detecting means 18 for detecting the timing at which the engine 1 is desired or required to be switched from one engine operating condition to another, a fuel adjusting means 8 for variably controlling the amount of fuel to be supplied to the engine 1, an A/F ratio setting means 19 for setting the lower or higher A/F ratio of a combustible mixture than the critical A/F ratio to the higher or lower A/F ratio than the critical A/F ratio at which the engine 1 can produce substantially the same or intermediate torque as that produced by the same engine 1 with the supply of such combustible mixture, and a control means 20 operable in response to an output from the detecting means 18 to control the fuel adjusting means 8 in such a way that, at the time the engine 1 is desired or required to be switched from one engine operating condition to another, the A/F ratio lower or higher than the critical A/F ratio can be rapidly adjusted to the higher or lower A/F ratio set by the A/F ratio setting means and, thereafter, the A/F ratio can be progressively adjusted to a target or desired value.

Thus, during a transit condition in which the engine being operated under a certain engine operating condition is switched to a different engine operating condition, the A/F ratio which is lower or higher than the critical A/F ratio can be rapidly, and without attaining a value equal or generally equal to the critical A/F ratio, adjusted to a predetermined A/F ratio which is higher or lower than the critical A/F ratio and at which the engine can produce substantially the same or intermediate torque as that produced by the same engine with the supply of the combustible mixture of the first mentioned A/F ratio, after which the combustible mixture to be supplied to the engine is progressively adjusted to the desired or target A/F ratio appropriate to such different engine operating condition. The fact that the A/F ratio being adjusted skips over the critical A/F ratio makes it possible to minimize not only the $NO_x$ emission, but also the occurrence of a torque shock which would occur when it is progressively adjusted from one value to the desired or target value by way of the critical A/F ratio.

Figure 2:
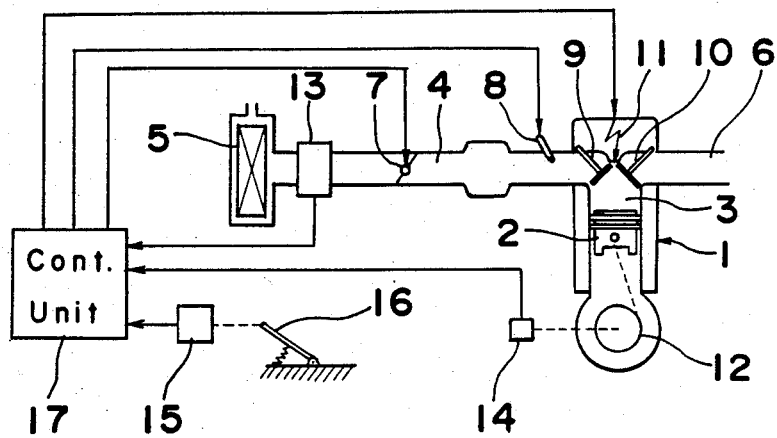
FIG. 2 is a schematic diagram showing an automobile power plant embodying the present invention.

Referring now to FIG. 2, the automobile engine 1 is shown as having a combustion chamber 3, a reciprocating piston 2 which varies the volume of the combustion chamber 3, an intake passage 4 communicated at one end to the atmosphere through an air cleaner 5 and at the other end with the combustion chamber 3 through an intake port adapted to be selectively closed and opened by an intake valve 9, an exhaust passage 6 communicated at one end with the combustion chamber 3 through an exhaust port adapted to be selectively closed and opened by an exhaust valve 10 generally in opposite sense to the intake port, a throttle valve 7 disposed in the intake passage 4 for regulating the flow of air towards the combustion chamber 3, a fuel injector 8 for injecting fuel in a controlled manner into the intake passage 4 downstream of the throttle valve 7, an ignition plug 11 for igniting a combustible mixture within the combustion chamber 3, and a crankshaft 12 driven by the reciprocating piston 2 each time combustion of the combustible mixture takes place within the combustion chamber. For the purpose of the present invention, the fuel injector 8 constitutes the fuel adjusting means for variably controlling the amount of fuel to be supplied to the engine 1.

Also for the purpose of the present invention, the system shown therein includes an air flow sensor 13 for detecting, and generating an output indicative of, the flow of air through the intake passage 4 towards the engine 1, which sensor 13 is disposed on the intake passage 4 upstream of the throttle valve 7, an engine speed sensor 14 operatively coupled with the crankshaft 12 for detecting, and generating an output indicative of, the engine speed, an accelerator sensor 15 operatively coupled with an accelerator pedal 16 for detecting, and generating an output indicative of, the angle of displacement of the accelerator pedal 16 resulting from the foot-controlled depression, that is, the opening $\phi$, and a control unit 17 comprised of a central processing unit (CPU) and others used to control the fuel injector 8, the ignition plug 11 and the throttle valve 7, the outputs from the respective sensors 13, 14 and 15 being fed to the control unit 17.

Figure 4:
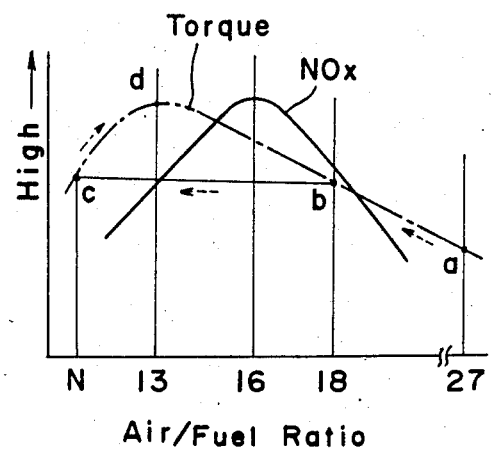
FIG. 4 is a graph showing the relationship among the $NO_x$ emission characteristic, the A/F ratio and the engine output torque, which is used to aid the understanding of the flowchart of FIG. 3.
Figure 3:
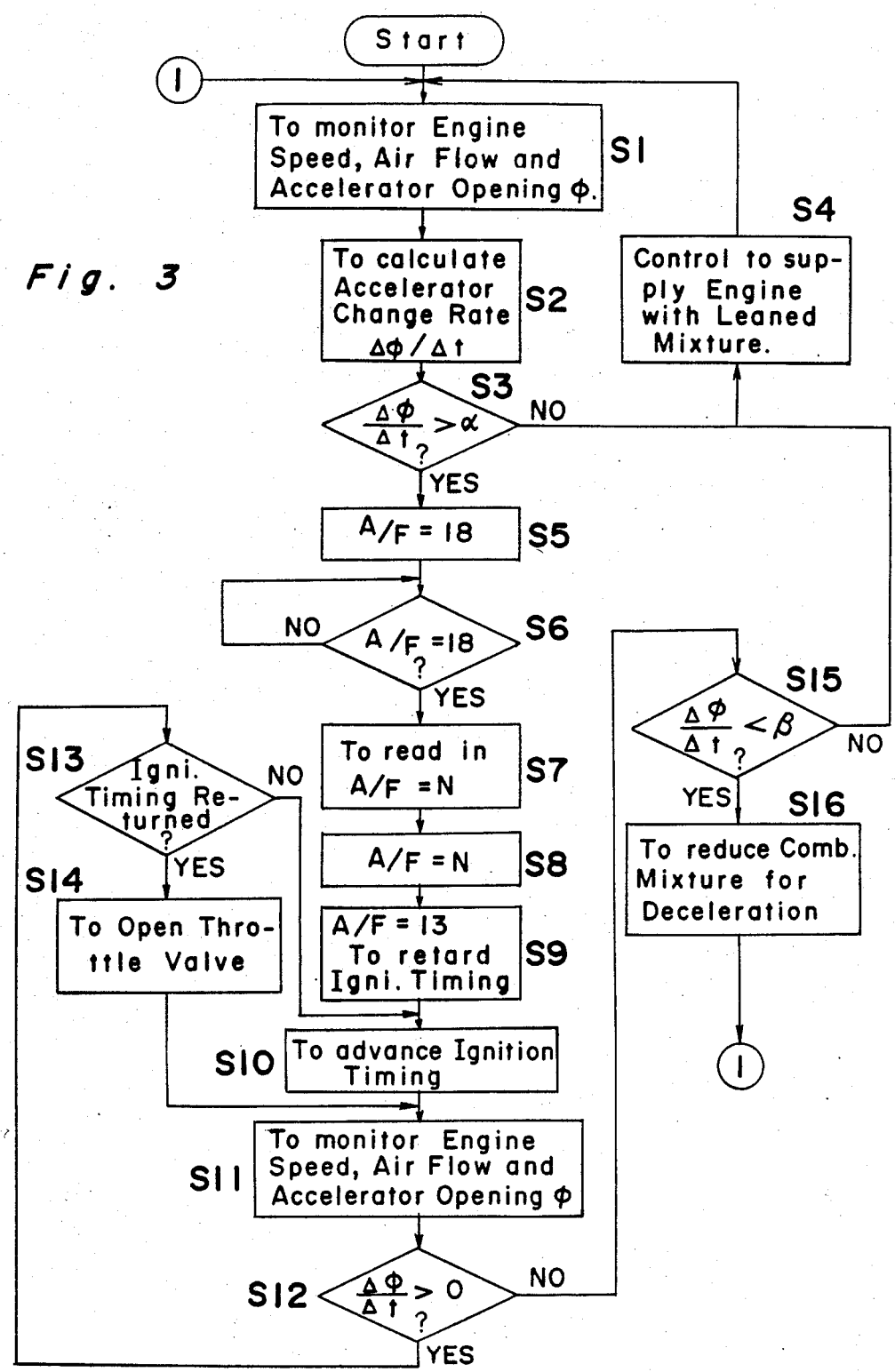
FIG. 3 is a flowchart showing the sequence of operation of a control unit.

The control unit 17 is so designed that during a normal engine operating condition, a combustible mixture to be supplied to the engine 1 can be adjusted as a rule to a higher A/F ratio of, for example, 27, than the critical A/F ratio of about 16, but during acceleration it can be adjusted to the A/F ratio which is lower than the critical A/F ratio, for example, 13, and at which the engine 1 can produce the maximum available torque, the sequence of operation of said control unit 17 being described with reference to the flowchart of FIG. 3 in combination with FIG. 4.

As shown in FIG. 3, subsequent to the start and at step S1, all of the signals fed respectively from the sensors 13 to 15, that is, an air flow signal indicative of the flow of air detected by the sensor 13, a speed signal indicative of the engine speed detected by the sensor 14, and an accelerator signal indicative of the accelerator opening $\phi$ detected by the sensor 15, are read in the control unit 17. At the subsequent step S2, the rate $\Delta\phi/\Delta t$ of change in accelerator opening $\phi$ is calculated, followed by a decision step S3 at which a decision is made to determine if the rate $\Delta\phi/\Delta t$ of change in accelerator opening, hereinafter referred to as "accelerator change rate", is greater than a predetermined value $\alpha$ representative of acceleration of the engine 1. If the accelerator change rate $\Delta\phi/\Delta t$ is equal to or smaller than the predetermined value $\alpha$, it means that the engine 1 is operated under a normal engine operating condition, not being accelerated, and the program flow proceeds to step S4 at which a fuel injection pulse of a predetermined pulse width is applied to the fuel injector 8 for adjusting the combustible mixture to be supplied to the engine 1 to a higher A/F ratio than the critical A/F ratio.

On the other hand, when the result of the decision at step S3 has indicated that the engine 1 is being accelerated, the program flow proceeds to step S5 at which a signal necessary to rapidly or progressively expand the pulse width of the fuel injection pulse is applied to the fuel injector 8 for adjusting the combustible mixture to be supplied to the engine 1 to a predetermined A/F ratio of, for example, 18. The program flow proceeds from step S5 to step S7 only when the result of decision made at step S6 indicates that the A/F ratio of the combustible mixture has attained the predetermined value of 18. The shift of the A/F ratio to the predetermined value of 18 is for the purpose of avoiding such a possibility that, at the time of setting or selecting a predetermined A/F ratio of, for example, N as shown in FIG. 4 which is higher than the critical A/F ratio and at which the engine can produce the same torque as that produced by the same engine with the supply of the combustible mixture of 18 in A/F ratio, the combustible mixture of N in A/F ratio would be excessively enriched. It is to be noted that the decision step S6 may not be always necessary and it may be replaced with a "Waiting Mode" block in which the program flow will not be executed before the time-out of a preset time.

At step S7, the predetermined A/F ratio of N higher than the critical A/F ratio of about 16 and effective to permit the engine 1 to produce the same torque as that produced with the supply of the combustible mixture of 18 in A/F ratio is read in from a map, followed by step S8 at which a signal necessary to expand the pulse width of the fuel injection pulse is applied to the fuel injector 8 for rapidly shifting the A/F ratio to the predetermined value N.

Thereafter, and at step S9, a signal necessary to rapidly reduce the predetermined A/F ratio of N to a target A/F ratio of, for example, 13, which is still higher than the critical A/F ratio and at which the engine can produce the maximum available torque, is applied to the fuel injector 8 and, at the same time, the extent to which the ignition timing is retarded for compensating for the increase in torque resulting from the above discussed shift in A/F ratio is read from a map and a signal indicative thereof is inputted to the ignition plug 11. The retardation of the ignition timing for compensating for the increase in torque of the engine resulting from the rapid adjustment in A/F ratio from N to 13 makes it possible to shift the A/F ratio to the target A/F ratio with no torque shock induced in the engine.

At step S10, the ignition timing of the ignition plug 11 is advanced a predetermined quantity dependent on the accelerator change rate $\Delta\phi/\Delta t$, and after all of the signals from the respective sensors 13 to 15 have been read in at step S11, a decision is made at step S12 to determine if the accelerator change rate $\Delta\phi/\Delta t$ is greater than zero signifying that the engine is being accelerated, the program flow proceeds to another decision step S13 to determine if the ignition timing so advanced has returned to the original preset timing. If the result of the decision at step S13 indicates "NO", the program flow from step S10 to step S13 is repeated until the result of the decision at step S13 comes to indicate "YES". When the result of the decision at step S13 has indicated "YES" signifying that the ignition timing advanced at step S10 has returned to the original preset timing, a signal necessary to open the throttle valve 7 for increasing the engine power output is applied to an actuator for the throttle valve 7, with the program flow subsequently returning to step S11. It is to be noted that in the embodiment now under discussion, the throttle valve 7 is not of a type operatively associated with the accelerator pedal 16, but of a type controlled by the actuator referred to above.

If the result of the decision at step S12 has indicated that the engine is not accelerated, the program flow proceeds to step S15 at which a decision is made to determine if the accelerator change rate $\Delta\phi/\Delta t$ is smaller than a predetermined value $\beta$ representative of deceleration. Should the accelerator change rate be equal to or greater than the predetermined value $\beta$ signifying that the engine is operated under a normal engine operating condition, not deceleration, the program flow proceeds to step S4 to enable the supply of the leaned combustible mixture to the engine, but when the accelerator change rate determined at step S15 is smaller than the predetermined value $\beta$, a signal is applied at step S16 to the fuel injector 8 for reducing the amount of combustible mixture being supplied to the engine according to the accelerator change rate $\Delta\phi/\Delta t$, the program flow thereafter returning to step S1. Since the shift of the combustible mixture from the lower A/F ratio to the higher A/F ratio takes place during the transition from idling to a low load engine operating condition or during the deceleration, the $NO_x$ emission is generally minimal at this time and, therefore, no A/F ratio control such as effected during the acceleration is required.

In the flowchart shown in and described with particular reference to FIG. 3, step S3 constitutes the detecting means 18 for detecting the timing at which the engine 1 is required to be switched from the normal engine operating condition to the acceleration, and step S7 constitutes the A/F ratio setting means 19 for setting the higher A/F ratio (A/F=18) than the critical A/F ratio (A/F≈16) to the lower A/F ratio (A/F=N) than the critical A/F ratio at which the engine can produce substantially the same torque as that produced by the same engine with the supply of the combustible mixture of such higher A/F ratio (A/F=18). Steps S8 and S9 altogether constitute the control means 20 operable in response to an output from the detecting means 18 to control the fuel adjusting means 8 in such a way that, at the time the engine 1 is required to be switched from the normal engine operating condition to the acceleration, the higher A/F ratio (A/F=18) than the critical A/F ratio can be rapidly adjusted to the lower A/F ratio (A/F=N) set by the A/F ratio setting means and, thereafter, the A/F ratio (A/F=N) can be progressively adjusted to the target value (A/F=13 at which the engine can produce the maximum available torque).

Accordingly, in the foregoing embodiment, when the necessity arises for the engine being operated under the normal operating condition to be accelerated, the A/F ratio (=27) which has been adjusted to the higher value than the critical A/F ratio is, as best shown in FIG. 4, rapidly or progressively adjusted to a first predetermined A/F ratio (=18) still higher than the critical A/F ratio (as indicated by the arrow from point a to point b) and is then rapidly adjusted to a second predetermined A/F ratio (=N) which is lower than the critical A/F ratio and at which the engine can produce substantially the same torque as that produced with the supply of the combustible mixture of the first predetermined A/F ratio (=18), (as indicated by the arrow from point b to point c). The A/F ratio so adjusted rapidly to the second predetermined value (=N) is then progressively adjusted to a target A/F ratio (=13) which is lower than the critical A/F ratio and at which the engine can produce the maximum available torque as indicated by the arrow from point c to point d. This control makes it possible to minimize not only the torque shock which would occur during the transit engine operating condition with the drivability consequently improved, but also the $NO_x$ emission because the supply of the combustible mixture of the critical A/F ratio does not substantially take place.

Moreover, since the A/F ratio (=27) higher than the first predetermined value (=18) is temporarily rapidly or progressively adjusted to the first predetermined value before it is adjusted to the second predetermined value (=N), without being drastically adjusted to the second predetermined value, the combustible mixture of the second predetermined A/F ratio (=N) will not be excessively enriched and, therefore, the fuel consumption during the A/F ratio control effected in the above described manner can also be minimized.

A modified form of embodiment of the present invention will now be described with reference to the flowchart of FIG. 5. In this case, the throttle valve 7 shown in FIG. 2 is of a type operatively associated with the accelerator pedal 16 by means of any known linkage system as is conventionally practiced.

Figure 5:
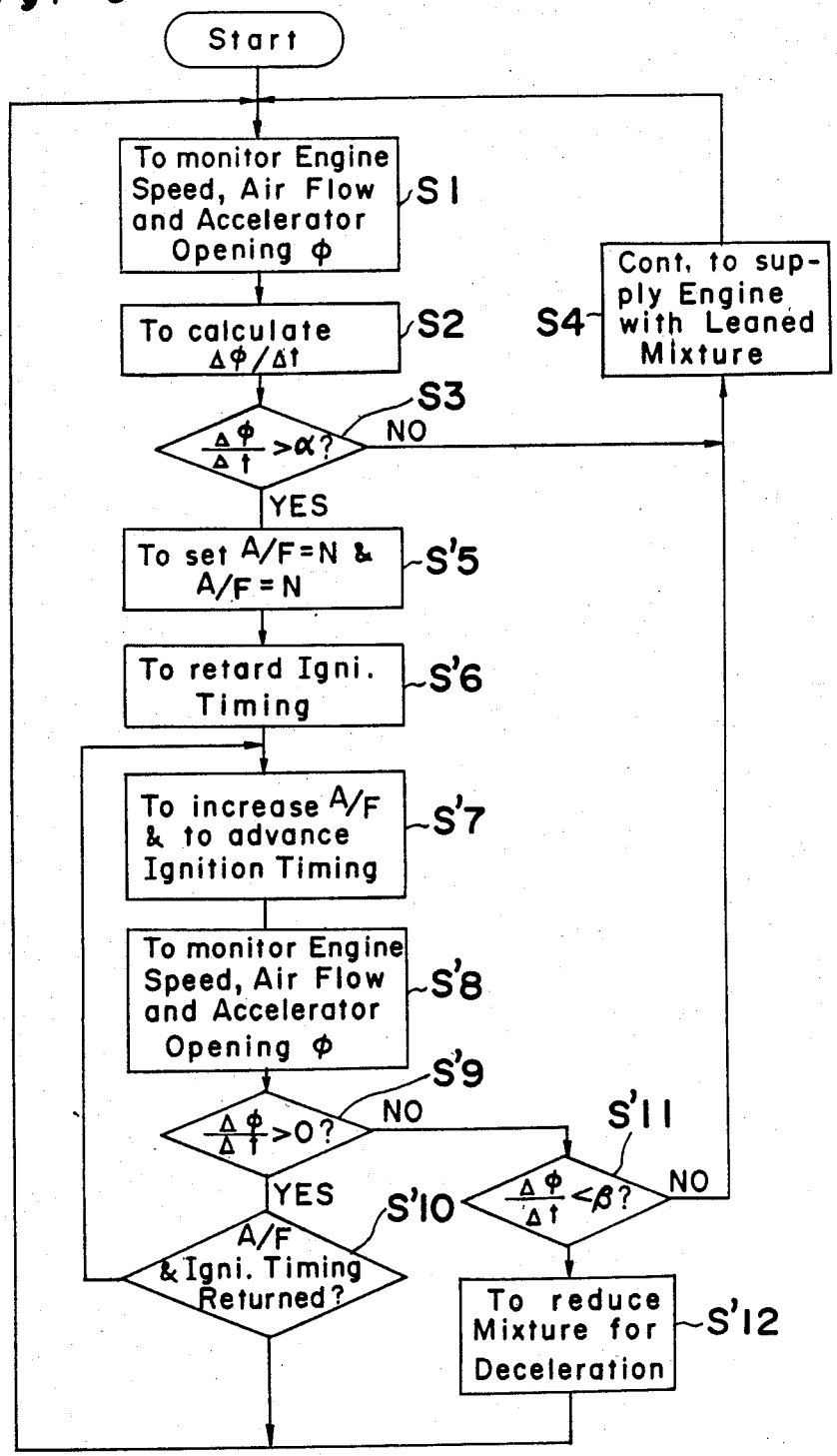
FIG. 5 is a flowchart showing a modified form of the sequence of operation of the control unit.

Referring to FIG. 5, the program flow from step S1 to S4 subsequently to the start is identical with that shown in FIG. 3. Therefore, starting from the "YES" result of the decision at step S3, that is, when the engine is determined as being accelerated, the present A/F ratio (=N) lower than both the critical A/F ratio and the A/F ratio (=24) of the combustible mixture currently supplied to the engine which is higher than the critical A/F ratio, that is, the preset A/F ratio (=N) on one side of the A/F ratio (=24), to which the combustible mixture is currently adjusted, opposite to the critical A/F ratio as viewed in the graph of FIG. 4, and at which the engine can produce substantially the same or intermediate torque, is read from a map at step S'5 and, at the same time, a signal is outputted to the fuel injector 8 for increasing the pulse width of a fuel injection pulse so that the combustible mixture can be rapidly adjusted to the preset A/F ratio (=N). The setting of the preset A/F ratio (=N) is so performed that the rapid shift of the A/F ratio higher than the critical A/F ratio to the preset A/F value (=N) will not result in the drastic change in torque and, also, the excessive enrichment of the combustible mixture while permitting the engine to produce substantially the same or intermediate torque.

At subsequent step S'6, the extent to which the ignition timing is retarded for compensating for the increase of the torque as a result of the above described shift in A/F ratio is read from a map and a signal indicative thereof is outputted to the ignition plug 11, followed by step S'7 at which the pulse width of the fuel injection pulse is progressively reduced for the purpose of progressively leaning the combustible mixture from the preset A/F value (=N) to the target A/F ratio (=13) and, at the same time, the ignition timing is advanced according to the accelerator change rate $\Delta\phi/\Delta t$. Thereafter and at step S'8, all of the signals from the sensors 13 to 15 are monitored and, at subsequent step S'9, a decision is made to determine if the accelerator change rate $\Delta\phi/\Delta t$ is greater than zero. If the result of the decision at step S'9 indicates "YES" signifying that the engine is being accelerated, the program flow proceeds to a decision step S'10 to determine if both the A/F ratio and the ignition timing have attained a predetermined value. Should the result of the decision at step S'10 indicate "NO", the program flow proceeds to step S'7. Only when and after both the A/F ratio and the ignition timing have attained the predetermined value, the program flow returns to step S1.

On the other hand, if the result of the decision at step S'9 has indicated "NO", the program flow proceeds to step S'11 at which a decision is made to determine if the accelerator change rate $\Delta\phi/\Delta t$ is smaller than the predetermined value $\beta$. If the accelerator change rate is found to be equal to or greater than the predetermined value $\beta$ signifying that the engine is operated under a normal engine operating condition, the program flow proceeds to step S4 in the manner as hereinbefore described with reference to FIG. 3, but if the accelerator change rate is found to be smaller than the predetermined value signifying that the engine is being decelerated, the program flow proceeds to step S'12, which is identical with step S16 in FIG. 3, and then back to step S1 in the manner similar to that described with reference to FIG. 3 in connection with steps S15 and S16.

The flowchart of FIG. 5 can be best understood from FIG. 6 which will now be described. It is, however, to be noted that step S'5 constitutes the A/F ratio setting means 19, and steps S'5 to S'10 altogether constitute the control means 20.

Figure 6:
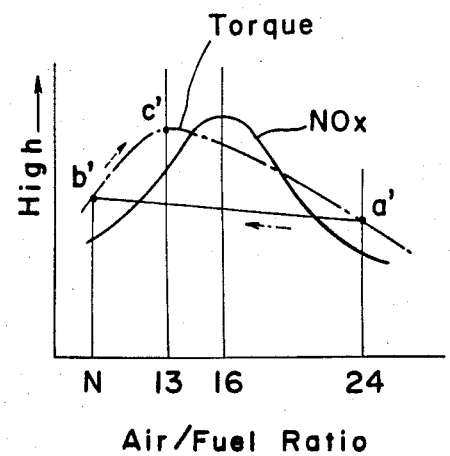
FIG. 6 is a graph similar to FIG. 4, but pertaining to the flowchart of FIG. 5.

In the embodiment shown in and described with reference to FIG. 5, when the necessity arises for the engine being operated under the normal operating condition to be accelerated, the A/F ratio (=24) of the combustible mixture then supplied to the engine is, as best shown in FIG. 6, rapidly adjusted to the preset A/F ratio (=N) which is lower than the critical A/F ratio and at which the engine can produce substantially the same or intermediate torque (as indicated by the arrow from point a' to point b'), and is subsequently progressively adjusted to the target A/F ratio (=13) which is lower than the critical A/F ratio and at which the engine can produce the maximum available torque as indicated by the arrow from point b' to point c'. As is the case with the embodiment shown in and described with reference to FIGS. 3 and 4, even the embodiment of FIGS. 5 and 6 is effective to minimize both the $NO_x$ emission and the torque shock.

Although the present invention has been fully described in connection with the preferred embodiments thereof with reference to the accompanying drawings, it is to be noted that various changes and modifications are apparent to those skilled in the art. By way of example, although in the description of the embodiments reference has been made to the example wherein the combustion mixture is adjusted from the high A/F ratio to the low A/F ratio skipping over the critical A/F ratio incident to the change in operating condition from the normal engine operating condition to the acceleration, a similar control can take place even when the engine being operated under a low or medium load operating condition is brought in a high load operating condition. The concept of the present invention is likewise applicable to the case wherein the combustion mixture is adjusted from the low A/F ratio to the high A/F ratio skipping over the critical A/F ratio, such as necessitated when the engine is brought in the normal operating condition from a cold start, or when the engine being operating with the supply of the combustible mixture of stoichiometric A/F ratio is to be operated with the supply of the leaned combustible mixture.

Accordingly, such changes and modifications are to be understood as included within the scope of the present invention as defined by the appended claims unless they depart therefrom.

What is claimed is:

1. A fuel supply control system for an internal combustion engine designed to adjust a combustible air-fuel mixture to be supplied to the engine according to engine operation condition from one of lower and higher A/F ratios than the critical A/F ratio at which the $NO_x$ emission from the engine is maximum, to the other of the lower and higher A/F ratios, which system comprises:
   a detecting means for detecting the timing at which the engine is switched from one engine operating condition to a different engine operating condition;
   a fuel adjusting means for variably controlling the amount of fuel to be supplied to the engine;
   an A/F ratio setting means for setting one of the lower or higher A/F ratios than the critical A/F ratio to the other of the lower and higher A/F ratios than the critical A/F ratio at which the engine can produce substantially the same torque as that produced by the engine with the supply of a combustible mixture of said one of the lower and higher A/F ratios than the critical A/F ratio; and
   a control means operable in response to an output from the detecting means to control the fuel adjusting means in such a way that, at the time the engine is switched from one engine operating condition to a different engine operating condition, said one of the lower and higher A/F ratios than the critical A/F ratio can be rapidly adjusted to said other of the lower and higher A/F ratios than the critical A/F ratio set by the A/F ratio setting means and, thereafter, the A/F ratio can be progressively adjusted to a target A/F ratio.

2. The system as claimed in claim 1, wherein prior to the combustible mixture being adjusted to said other of the lower and higher A/F ratios, it is adjusted to an A/F ratio approximately predetermined small amount to the critical A/F ratio at the time of switching of the engine operating condition.

3. The system as claimed in claim 2, wherein said other of the lower and higher A/F ratios is preset beforehand.

4. The system as claimed in claim 2, wherein said other of the lower and higher A/F ratios is preset beforehand and, when the combustible mixture has attained said one of the lower and higher A/F ratios, said one of the lower and higher A/F ratios is rapidly adjusted to said other of the lower and higher A/F ratios.

5. The system as claimed in claim 2, wherein the combustible mixture of said other of the lower and higher A/F ratios is rapidly adjusted to the target A/F ratio, and wherein an ignition timing is, simultaneously therewith, retarded to compensate for increase in torque.

6. The system as claimed in claim 1, wherein said timing is the start of acceleration.

7. The system as claimed in claim 1, wherein said one of the lower and higher A/F ratio and said other of the lower and higher A/F ratios are the higher A/F ratio and the lower A/F ratio, respectively, than a stoichiometric A/F ratio.

8. The system as claimed in claim 1, wherein said one of the lower and higher A/F ratios and said other of the lower and higher A/F ratios are the lower A/F ratio and the higher A/F ratio, respectively, than a stoichiometric A/F ratio.

9. The system as claimed in claim 1, wherein the combustible mixture being supplied to the engine at said timing is rapidly adjusted to said other of the lower and higher A/F ratios.

10. The system as claimed in claim 9, wherein the combustible mixture of said other of the lower and higher A/F ratios is rapidly adjusted to the target A/F ratio, and wherein an ignition timing is, simultaneously therewith, retarded to compensate for increase in torque.

11. A fuel supply control system for an internal combustion engine designed to adjust a combustible air-fuel mixture to be supplied to the engine according to engine operation condition from one of lower and higher A/F ratios than the critical A/F ratio at which the $NO_x$ emission from the engine is maximum, to the other of the lower and higher A/F ratios, which system comprises:
    a detecting means for detecting the timing at which the engine is switched from one engine operating condition to a different engine operating condition;
    a fuel adjusting means for variably controlling the amount of fuel to be supplied to the engine;
    an A/F ratio setting means for setting an A/F ratio lower or higher than the critical A/F ratio and at which the difference in torque relative to the torque produced by the engine with the supply of a combustible mixture of a target A/F ratio is small; and
    a control means operable in response to an output from the detecting means to control the fuel adjusting means in such a way that, at the time the engine is switched from one engine operating condition to a different engine operating condition, said one of the lower and higher A/F ratios than the critical A/F ratio can be rapidly adjusted to said A/F ratio set by the A/F ratio setting means and, thereafter, the A/F ratio can be progressively adjusted to a target A/F ratio.

12. The system as claimed in claim 11, wherein said one of the lower and higher A/F ratio and said other of the lower and higher A/F ratios are the higher A/F ratio and the lower A/F ratio, respectively, than a stoichiometric A/F ratio.

13. The system as claimed in claim 11, wherein said one of the lower and higher A/F ratios and said other of the lower and higher A/F ratios are the lower A/F ratio and the higher A/F ratio, respectively, than a stoichiometric A/F ratio.

14. The system as claimed in claim 11, wherein said timing is the start of acceleration.

* * * * *